US010650447B1

(12) United States Patent
Cononico

(10) Patent No.: US 10,650,447 B1
(45) Date of Patent: May 12, 2020

(54) COMPUTING SYSTEMS FOR MANAGING AND ADMINISTERING DYNAMIC LETTERS OF CREDIT

(71) Applicant: GCSA Capital LLC, New York, NY (US)

(72) Inventor: Christopher Cononico, Atlantic Highlands, NJ (US)

(73) Assignee: GCSA CAPITAL LLC, New York, NY (US)

( * ) Notice: Subject to any disclaimer, the term of this patent is extended or adjusted under 35 U.S.C. 154(b) by 128 days.

(21) Appl. No.: 15/946,674

(22) Filed: Apr. 5, 2018

Related U.S. Application Data

(60) Provisional application No. 62/503,453, filed on May 9, 2017.

(51) Int. Cl.
G06Q 40/02 (2012.01)
H04L 9/32 (2006.01)
G06Q 20/10 (2012.01)

(52) U.S. Cl.
CPC ......... G06Q 40/025 (2013.01); G06Q 20/102 (2013.01); H04L 9/3247 (2013.01)

(58) Field of Classification Search
CPC .................................................. G06Q 40/025
See application file for complete search history.

(56) References Cited

U.S. PATENT DOCUMENTS

| 8,660,927 | B2* | 2/2014 | Cassano | G06Q 20/10 705/35 |
| 2010/0153258 | A1* | 6/2010 | Aggarwal | G06Q 40/025 705/38 |
| 2011/0131067 | A1* | 6/2011 | Butcher, III | G06Q 40/04 705/4 |
| 2018/0122002 | A1* | 5/2018 | Kelly | G06Q 40/025 |

OTHER PUBLICATIONS

Voordeckers, Steijvers, 2006, "Business collateral and personal commitments in SME lending," (Year: 2006).*

* cited by examiner

Primary Examiner — Olabode Akintola
Assistant Examiner — Brandon M Duck
(74) Attorney, Agent, or Firm — Perkins Coie LLP

(57) ABSTRACT

Controlling communications between arrangements of computing systems improves letter of credit ("LC") administration, speed, flexibility, and reach. The computing systems can be operated by an Applicant, Issuer, Custody Bank, and Beneficiary. LC improvements are achieved by the Applicant computing system making a LC request to the Issuer computing system, which obtains a hold on non-cash collateral and provides the hold to the Custody Bank computing system, designating the Custody Bank as both nominated person and paying agent. The Custody Bank computing system obtains a hold on the collateral, using it to immediately act on Beneficiary payment requests in kind of the collateral. Under these arrangements, the LC is capable of immediate payment and automated amendments to Stated Amounts to rebalance capacity amongst Beneficiaries of the (Continued)

Applicant, the LC Stated Amount and collateral values are always equal, and the LC is less susceptible to payment interference, automatic stays, and double payment.

19 Claims, 9 Drawing Sheets

COMPUTING SYSTEMS FOR MANAGING AND ADMINISTERING DYNAMIC LETTERS OF CREDIT

CROSS-REFERENCE TO RELATED APPLICATIONS

This application claims priority to U.S. Provisional Patent Application No. 62/503,453, filed May 9, 2017, titled "Prefunded Trust (Standby) Letter of Credit," which is herein incorporated by reference in its entirety.

TECHNICAL FIELD

The present disclosure is directed to implementing a network of computing systems that can interact to provide a new type of letter of credit by generating representative data structures and automatically updating fields of the data structures, in real time, such that a value of non-cash collateral prefunding the letter of credit continuously matches a Stated Amount, allowing such letters of credit to be issued and amended upon request with Stated Amounts rebalanced in real time across multiple letters of credit, and enabling immediate verification of digital demands for payment and immediate honoring of the letters of credit by computer systems from collateral held without risk of double payment or illegal payment due to an automatic stay.

BACKGROUND

A letter of credit ("LC") is a promise by an "Issuer" (e.g., a bank or corporation) to make an unsecured payment (generally a fixed cash value), upon satisfaction of the documentary conditions specified in the letter of credit, to a "Beneficiary" on behalf of an "Applicant." Letters of credit have a fixed cash value (or "Stated Amount") so that the Beneficiary has certainty as to the payment it can demand and the Issuer has certainty regarding its potential payment obligation, so it can manage its liquidity accordingly. Bank issuers of letters of credit generally set aside a fraction of the Stated Amount in the form of capital and liquid assets as only a small portion of issued LCs are expected to be drawn by Beneficiaries at any given time. Letters of credit are typically subject to the Uniform Customs and Practice for Documentary Credits (2007 Revision), International Chamber of Commerce Publication No. 600 (the "UCP") and the law of the jurisdiction indicated in the letter of credit.

A letter of credit is composed of three separate commitments: (i) the underlying contract between the Applicant and Beneficiary, (ii) the contract between the Applicant and the Issuer whereby the Applicant promises to repay the Issuer for any payments made to the Beneficiary in accordance with the terms of the letter of credit, and (iii) the letter of credit itself, whereby the Issuer is obligated to make payment to the Beneficiary for the Stated Amount in accordance with the terms of the letter of credit.

In order to draw upon the letter of credit, a Beneficiary or its advising bank is required to present a demand for payment to the Issuer or its nominated person or confirming bank and provide the necessary documentation. Conventionally, this could be by facsimile, in hand delivery, or by text in a SWIFT message. Accordingly, the Issuer or its confirming bank either will honor such demand (i.e., make payment to the Beneficiary) in accordance with its internal procedures, provided the documentary conditions of the LC have been met, or will dishonor such draw request (i.e., not make payment to the Beneficiary). If payment is made by a confirming bank, the confirming bank will then seek reimbursement from the Issuer. While many letters of credit are drafted to be "payable on sight," it typically requires at least several business days to receive payment, because of the need to review the documentary requirements and complete internal procedures, which may be an unacceptable delay for certain use cases.

If the Issuer of an LC were to become insolvent at the time of presentment of a demand for payment by the Beneficiary, the Beneficiary may not receive its payment from the Issuer. The Beneficiary thereby has unsecured counterparty risk to the Issuer. Letters of credit are also generally issued by banks or affiliates of the Applicant. This presents default correlation ("wrong way risk"), particularly when the applicant of the letter of credit is also a financial institution. Both unsecured counterparty risk and wrong-way risk are significant impediments to the broader acceptance of letters of credit for new use cases.

In some implementations, an Applicant deposits cash in advance with the bank issuing the letter of credit for the Stated Amount of the letter of credit. This is for the protection of the issuing bank to be repaid, not the Beneficiary. These cash accounts are not segregated and held exclusively for payment of the letter of credit. They are not held for the benefit of the Beneficiary and do not increase speed of payment or guarantee payment. Further, depositing cash into a segregated custody account is particularly expensive as it would provide no return, which is one reason it doesn't occur in practice. Currently, letters of credit are not designed for real time immediate payment, particularly under stressed financial conditions, after considering the operational set up and economic incentives of the banks issuing the letters of credit.

Once a letter of credit is issued, any amendments must be approved by the Issuer, the Applicant, and the Beneficiary in writing. This can be expensive and time consuming to approve and document amongst the parties and, at a minimum, could take several days. For an Applicant that requires daily amending of its letters of credit, the traditional system cannot meet that timing requirement.

Financial Market Infrastructure ("FMI") is a system for clearing, settlement, or recording payments, securities, derivatives or other financial transactions. FMI that manages credit risk require that participants deposit "prefunded" initial margin or performance bond and prefunded contributions to mutualized default or guarantee funds. Letters of credit are currently not deemed to be "prefunded" by many regulators and are viewed as unsecured counterparty risk. The Basel Committee on Banking Supervision ("BCBS") and International Organization of Securities Commissions ("IOSCO") also recommended global standards for margining of non-cleared over-the-counter ("OTC") derivatives, and such recommendations have been implemented by local regulators around the world. Letters of credit are similarly not deemed to be "prefunded" by many regulators to qualify as eligible assets for initial margin for OTC uncleared derivatives.

Clearing participants and derivatives counterparties experience continuous changes in their current and potential future exposures as a result of changing market prices and portfolio positioning. The calculated amounts due for initial margin, performance bonds, and default fund or guarantee fund contributions can vary significantly throughout a trading day. A traditional letter of credit, assuming it could be an acceptable form of collateral, is inefficient because of its static nature as it's not designed for daily amending and rebalancing. For example, a market participant would not wish to pay for the capacity of $100 Stated Amount of a letter of credit issued to a single Beneficiary if the Applicant's risk is changing frequently and it may soon only be required to post $1 of collateral to that same counterparty, thus making letters of credit an inefficient tool. Rather the Applicant would prefer to be able to reduce the Stated Amount of the letter of credit to $1 and increase the Stated Amounts of other letters of credit where it may be able to use the capacity. Traditional letters of credit cannot reliably amend Stated Amounts amongst Beneficiaries on a daily basis.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
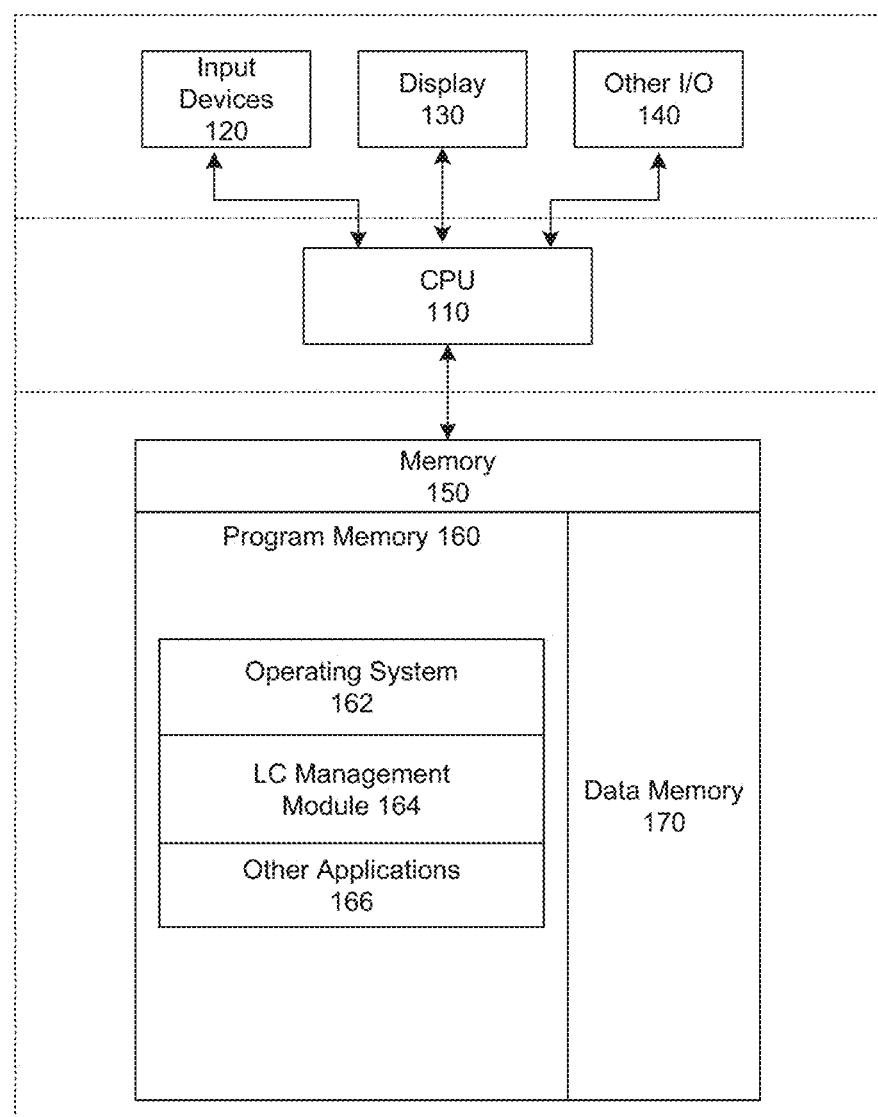
FIG. 1 is a block diagram illustrating an overview of devices on which some implementations can operate.

Embodiments are disclosed herein for arranging a network of computing systems to improve letter of credit ("LC") administration, payment speed, flexibility, safety, and expand the reach of letters of credit by specifying steps of communications between the computing systems and creation and control over data structures used by an Applicant computing system, an Issuer computing system, a Custody Bank computing system, and a Beneficiary computing system. By performing the steps and implementing the data structures disclosed herein, the network of computing systems are able to issue and use letters of credit with expanded capabilities, that ease use, and that reduce uncertainties while making the letters of credit applicable in a greater number of situations, as compared to conventional systems and techniques.

Steps for achieving these improvements, taken by the Issuer computing system, can include receiving a digital LC request from the Applicant computing system, obtaining a digital hold on a specified collateral, generating a first LC data structure and including the digital hold in the first LC data structure, generating and closing agreement documents, providing the LC data structure to a Custody Bank computing system, and initiating reporting procedures. In some implementations, various of the steps taken by the Issuer computing system are performed by a first automated agent software module that interfaces with business systems to provide automated control of the first LC data structure. Additional details regarding the processing performed by the Issuer computing system are provided below in relation to FIGS. 3A and 4.

Further steps for achieving these improvements, taken by the Custody Bank computing system, can include receiving a version of the first LC data structure from the Issuer computing system; generating a second LC data structure that includes one or more fields from the first LC data structure and provides a hold on the collateral identified from the first LC data structure; initiating reporting procedures based on the second LC data structure; acting on payment requests from a computing system of a Beneficiary identified in the second LC data structure by: causing a payment to the Beneficiary in a form matching the collateral or using the hold provided by the second LC data structure to provide the Beneficiary access to the collateral and updating fields of the second LC data structure to reflect the response to the payment request. In some implementations, a number of the steps taken by the Custody Bank computing system are performed by a second automated agent software module that interfaces with business systems to provide automated control of the second LC data structure. Additional details regarding the processing performed by the Custody Bank computing system are provided below in relation to FIGS. 3D and 5.

Additional steps for achieving the improvements can be performed by a third automated agent software module executed by a Beneficiary computing system or a fourth automated agent software module executed by an Applicant computing system. These automated agents can also automatically interface with business systems to provide control of corresponding LC data structures and intercommunication between the computing systems. For example, the automated agent software module executed by the Beneficiary computing system can perform operations for processing LC amendments, updating its LC data structure, and reporting based on the updated LC data structure.

In the above processes, the demand for payment from the computer system of the Beneficiary to the computer system of the Custody Bank can be a digital message with a digital signature that can be verified by the computer system of the Custody Bank in real time. Likewise, the request by the computer system of the Applicant for amendments (for example, at the end of a trading day) to reapportion the Stated Amounts and shift the corresponding non-cash collateral amongst Beneficiaries can be received, confirmed, and processed by the computer systems of the Applicant, the computer system of the related Beneficiaries, the computer system of the Custody Bank, and the computer system of the Issuer in real time. By having the Custody Bank computing system pay the Beneficiary "in kind" with the deposited collateral already held in a segregated custody account, immediate payment in real time is possible for every letter of credit, while reducing the economic burden for the Issuer who may continue to receive related income distributions (for example, coupon payments) on the non-cash collateral it has deposited into the segregated custody account provided the LC remains undrawn. Because the non-cash collateral can continuously change in value (and its "dirty price" may change daily to reflect accrued and unpaid interest), the computer systems can keep it continuously synchronized and matched in real time with the Stated Amount. By having the non-cash collateral deposited by each Issuer computing system with a third-party Custody Bank computing system and, in some implementations of the present technology, incorporating the additional precautions of Issuers being bankruptcy remote entities, the robustness of the immediate payment system is further bolstered, by making the Beneficiary less susceptible to interference or even an automatic stay. Finally, because the Custody Bank holds the non-cash collateral (that has been pledged by the Issuer for the Beneficiary) in a segregated account exclusively to make payments in kind under the LC (and never from the Custody Bank's own assets) and because the Custody Bank computing system acts as both nominated person and paying agent on behalf of the Issuer, possibilities of double payment whereby the Issuer makes a payment and the Beneficiary declares default and seized collateral simultaneously, are eliminated.

As used herein, a "Stated Amount" of the letter of credit is the fixed amount of non-cash collateral with a value that continuously changes with market prices (and accrued interest). Collateral can be any asset with a fixed number of units (e.g., a denomination of par value), such as an amount of a designated security for example an ISIN or CUSIP (e.g., a certain U.S. Treasury security CUSIP). The "Custody Bank" is both nominated person and paying agent under the letter of credit, making the Custody Bank responsible for responding to payment demands and making payment under the letter of credit on behalf of the Issuer exclusively with the segregated non-cash collateral held by the Custody Bank for the letter of credit. Unlike a confirming bank or an issuing bank, the Custody Bank is not required to make payment from its own assets and the demand for payment under the LC is limited recourse exclusively to the existing collateral held in custody and pledged to the Beneficiary of a given LC. In some implementations of the present technology, the Expiry Date of the letter of credit would match or closely track the maturity date of the collateral.

As used herein, an LC data structure can be a database (whether operated by a single computing system or distributed across multiple computing systems), portion of a database (e.g., a collection of database entries), data object, collection of data objects, portion of memory, a file, structured text, binary, hexadecimal, or other encoded data, or combinations thereof. A "hold" on the collateral, as used herein, is data proving a right to use and transfer the collateral, such a database entry indicating the collateral is deposited in an account of the entity with the hold, ownership certification or identification numbers for the collateral, proof of purchase receipts, a ledger entry, etc.

In conventional systems, operational, technological, and economic challenges prevent the improvements described above. For example, collateral pledged and deposited with a custody bank to secure the letter of credit with a fixed cash value Stated Amount would result in continuous differences between the value of the collateral and the Stated Amount. For example, a letter of credit with a $100 Stated Amount might be backed by collateral with a value that is constantly either above or below $100. Having separate computing systems and technology platforms for the Issuer, Applicant, and Custody Bank, which may further be located in different countries and time zones, continuously update a letter of credit to match the collateral market value (and possible accrued interest) and continuously reconcile amongst each individual computer system and technology platform would not only be computationally expensive, the delay in accomplishing the updates and reconciliations would necessarily prevent the values from always having a constant match and from being synchronized across the parties, which would further complicate reconciliations and require additional efforts to manage disputes. If the Stated Amount is a fixed cash value, the Issuer computing system could pledge and deposit cash as collateral, which earns no return in a segregated custody account, and thus would be a more costly alternative. Otherwise, the Issuer, the Applicant, the Custody Bank, and the Beneficiary would need to continuously monitor collateral market value and, upon a mismatch, transfer collateral to match the fixed Stated Amount, which could never operationally (or economically) be done on a continuous basis, but rather would occur periodically or after certain designated thresholds have been breached. This introduces unsecured payment risk, increased transaction costs, and general inefficiency. Further, large scale payment systems (e.g., FedWire, CHIPS, and SWIFT) only operate during established bank operating hours, thus making it impossible for an Issuer to keep the non-cash collateral matching the Stated Amount during non-operating bank hours, while still being subject to the delay in exact value matches between non-cash collateral and Stated Amount. Further, if the Issuer became insolvent, the non-cash collateral pledged, even while sitting with the Custody Bank, could be subject to an automatic stay despite the perfected security interest, which would cause unacceptable time delays for the Beneficiary, thus nullifying many of the benefits of collateral for some use cases.

In addition, the conventional systems' imperfect synchronization of messages across different computing systems using different technology platforms across different geographical locations and under compressed timelines, exacerbated by both operational and human error that is beyond the control of the parties and permits undesirable double payment situations. For example, if in the conventional systems, collateral were pledged by the Issuer of the LC and perfected by control, the Beneficiary would control the custody account with a third-party Custody Bank. It may not be possible to avoid the Beneficiary simultaneously seizing the collateral while payment is made to the Beneficiary by the Issuer, particularly under compressed timeframes such as immediate payment or payment within 15 minutes.

No method or system exists in the conventional systems with a technical solution to overcome the impediments of issuing a LC that is fully and non-cash collateralized, whereby the non-cash collateral value and Stated Amount continuously match in real time across disparate computer systems and technology platforms located across geographies and time zones, whereby the system is capable of processing and confirming daily amendments to Stated Amounts to rebalance total undrawn capacity across letters of credit issued to Beneficiaries for each Applicant (as its needs and risk profile changes), whereby the computer system of the Custody Bank is capable of receiving a digital demand for payment from the computer system of the Beneficiary, whereby the only documentary condition to be satisfied is a digital signature (e.g. using private/public key pairs) that can be validated immediately and in real time by the computer system of the Custody Bank so that payment can actually be made immediately and in real time from prefunded resources held by the same Custody Bank in a segregated account, and whereby the possibility for double payment is eliminated. The arrangement of computing systems and data structures described herein overcome these limitations of conventional systems. In particular, the problems with the conventional systems are solved through implementation and interaction of A) the first automated agent executed by the Issuer computing system that establishes a first LC data structure with both applicant and beneficiary fields, and that provides access to non-cash collateral in a Stated Amount, and B) the second automated agent executed by a Custody Bank computing system that receives a version of the first LC data structure from the Issuer computing system establishing the Custody Bank as both the nominated person and paying agent, creates a second LC data structure providing a hold on the non-cash collateral, and makes payments in kind, using the second LC data structure, from the non-cash collateral. These improvements are further enabled through a third automated agent software module executed by the Beneficiary computing system and a fourth automated agent software module executed by the Applicant computing system that can also automatically interface with business systems to provide control of corresponding LC data structures and intercommunication between the computing systems. For example, the automated agent software module executed by the Beneficiary computing system can perform operations for processing LC amendments, updating its LC data structure, and reporting based on the updated LC data structure.

By implementing the processes and systems described herein, a LC can have improved speed of payment (in real time), more flexibility for amending Stated Amounts and rebalancing across Beneficiaries (in real time), and lower risk characteristics (i.e.—real time reconciliations across parties, no risk of double payment, etc.), with the added benefit of allowing the Stated Amount of the LC and the value of non-cash collateral (that earns a return) held in a segregated custody account to adjust dynamically amongst the relevant parties, while still being subject to various constraints and permission states as outlined in the reimbursement agreement, the LC, the security agreement, the custody agreement, and the trust agreement or trust declaration. By effectively using computer system automation for the overall utility, collateral flexibility, and dynamism, letters of credit will be enhanced for the Applicant's use across multiple Beneficiaries and new use cases.

Several implementations are discussed below in more detail in reference to the figures. FIG. 1, for example, is a block diagram illustrating an overview of devices on which some implementations of the disclosed technology can operate. The devices can comprise hardware components of a device 100 that manages LC data structures and interactions between computing systems of LC parties. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, LC management module 164, and other application programs 166. Memory 150 can also include data memory 170 that can include LC data structures, market data, reporting requirements, agreement documents, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, tablet devices, multiprocessor systems, microprocessor-based systems, network PCs, minicomputers, mainframe computers, distributed computing environments that include any of the above systems or devices, or the like.

Figure 2:
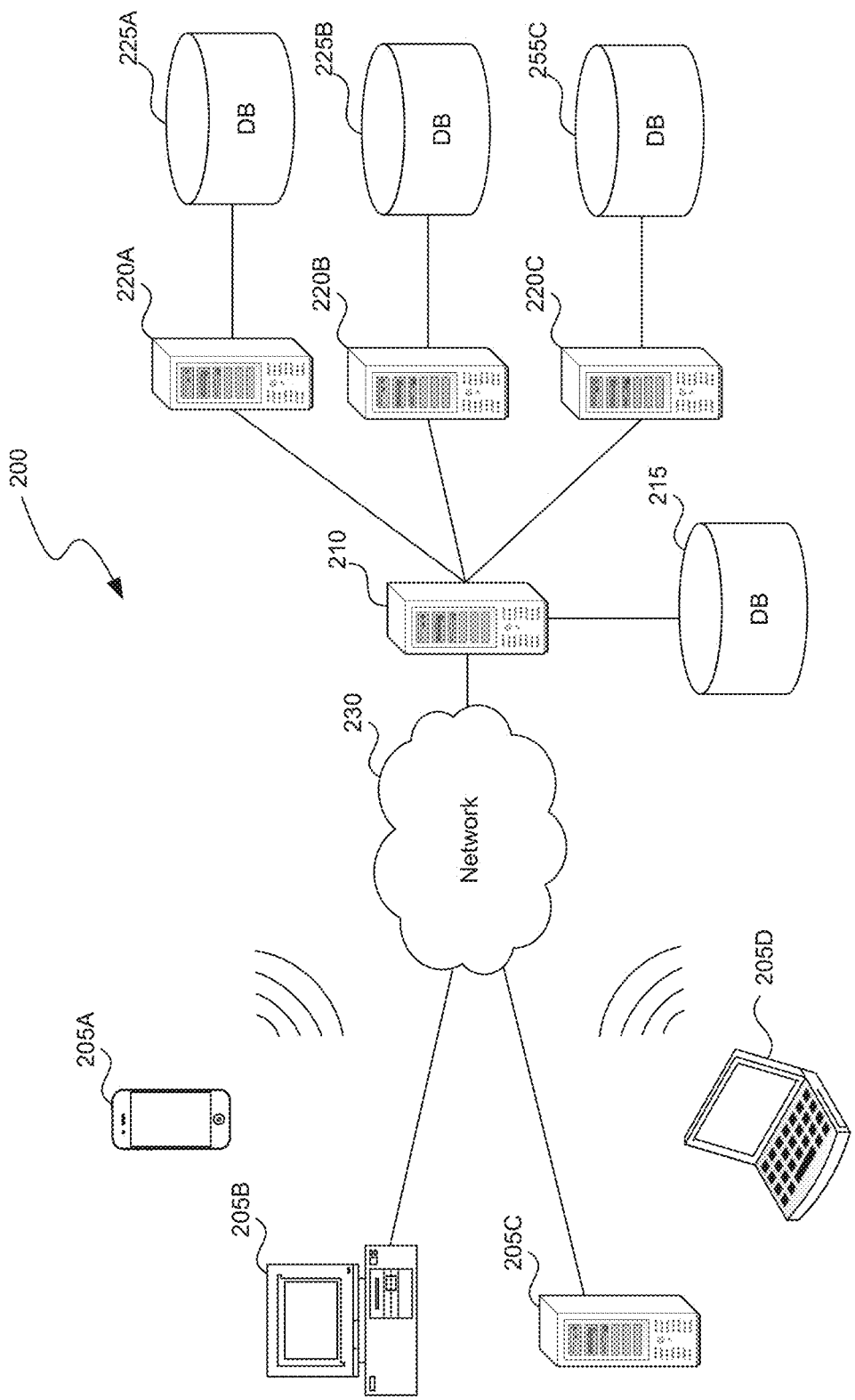
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

FIGS. 3A-3D are block diagrams illustrating components which, in some implementations, can be used in a system employing the disclosed technology. Each set of the components in FIGS. 3A-3D include hardware 302 and general software 320 and they each include one of specialized components 340A, 340B, 340C, or 340D. In some implementations, specialized components 340A, 340B, 340C, or 340D form a proprietary system, working in concert to provide the LC technology described herein. As discussed above, computing systems implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). General software 320 can include various applications including an operating system 322, local programs 324, and a basic input output system (BIOS) 326. Each set of components in FIGS. 3A-3D can be implemented in a client computing device such as client computing devices 205 or on a server computing device, such as server computing device 210 or 220.

Figure 3A:
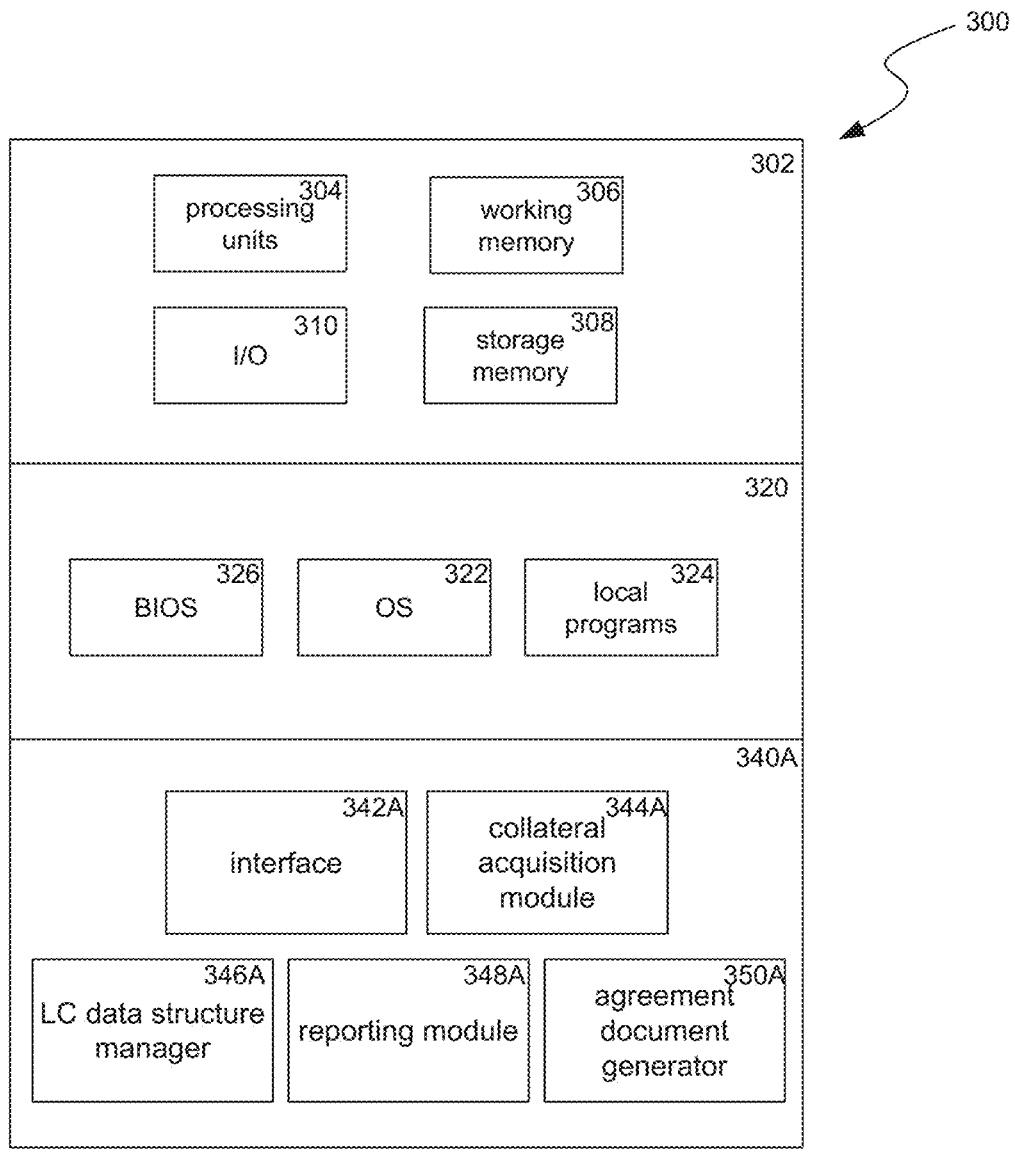
FIG. 3A is a block diagram illustrating a letter of credit Issuer computing system, used in some implementations to provide the disclosed technology.
Figure 3B:
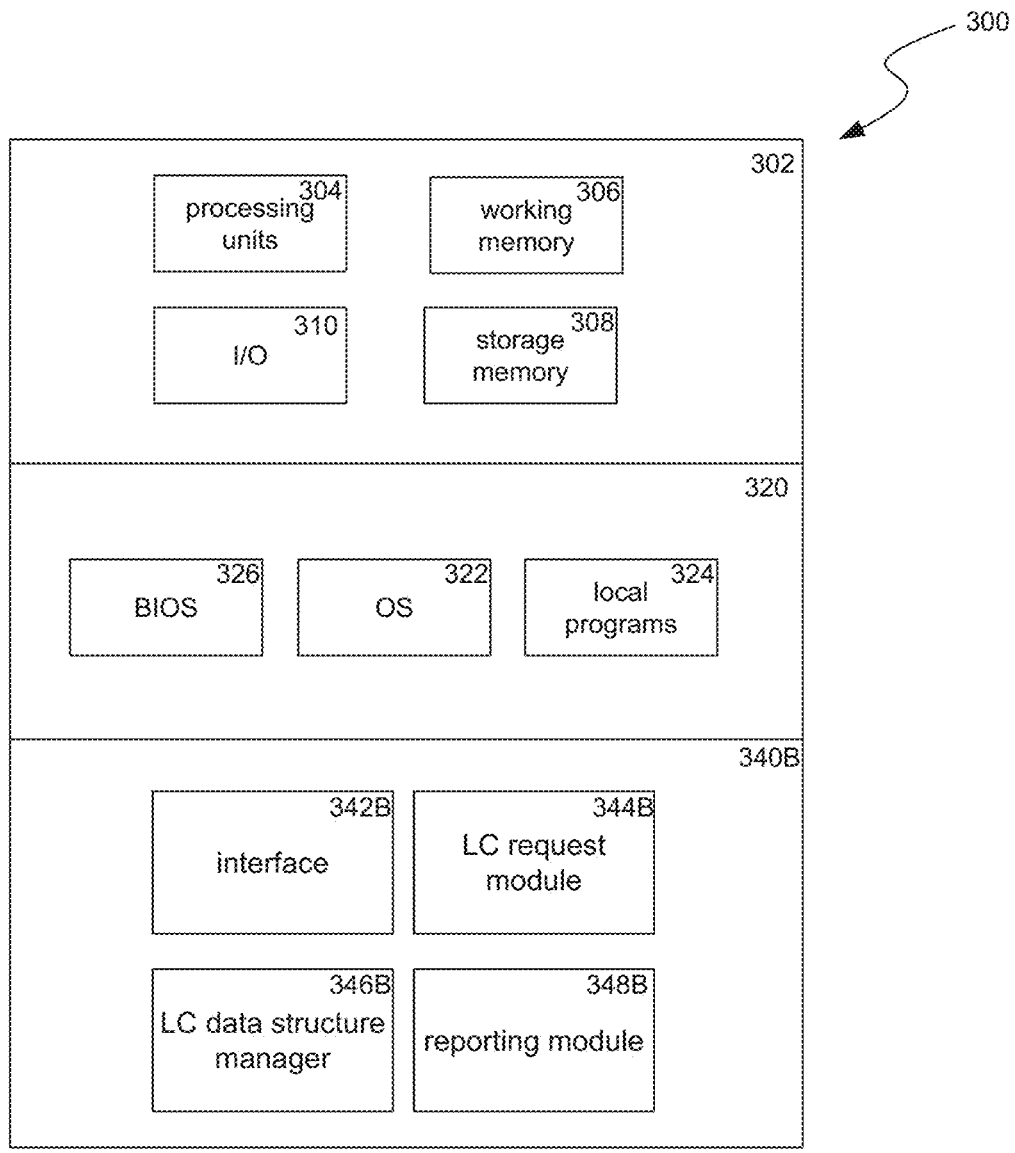
FIG. 3B is a block diagram illustrating a letter of credit Applicant computing system, used in some implementations to provide the disclosed technology.
Figure 3C:
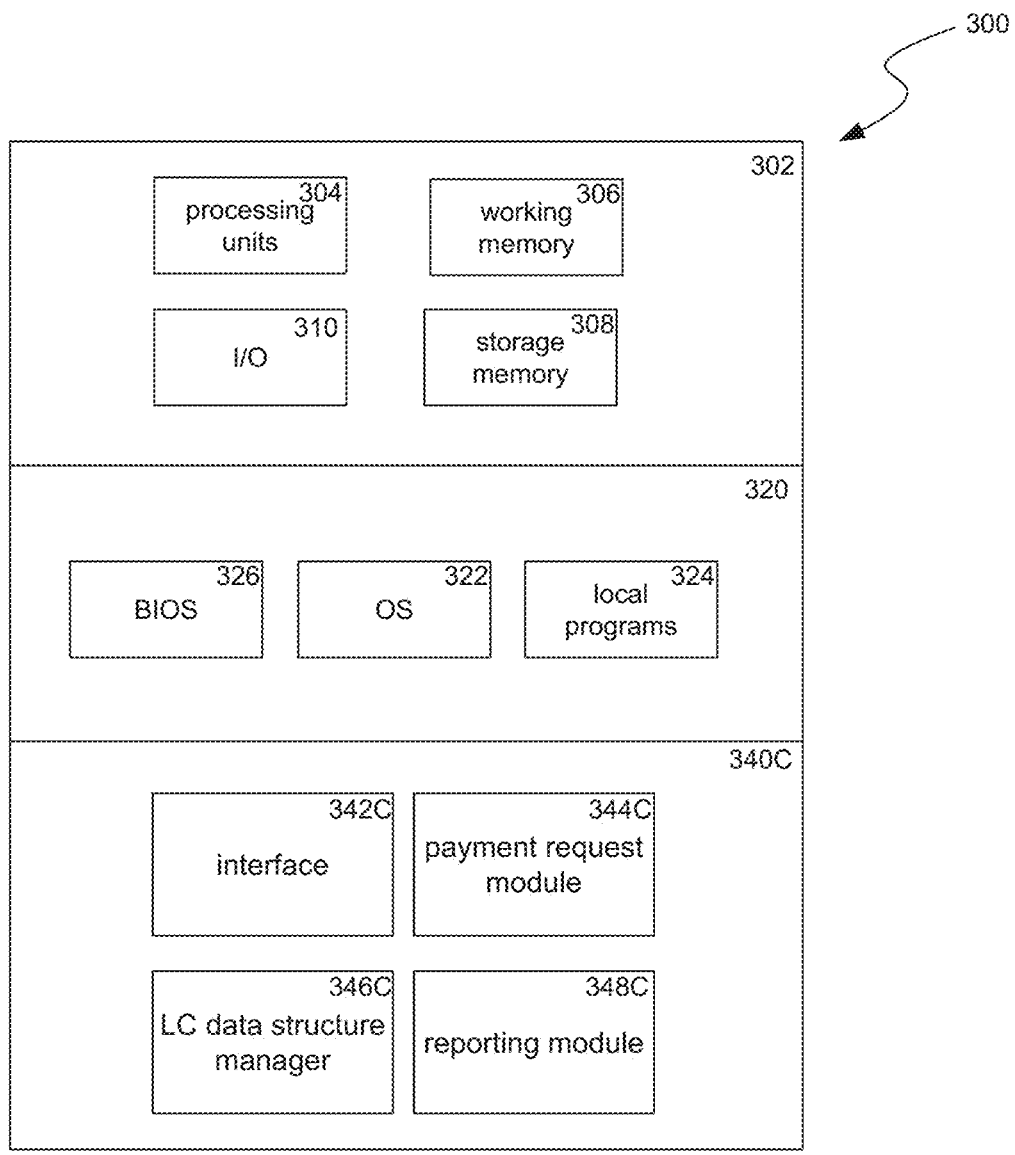
FIG. 3C is a block diagram illustrating a letter of credit Beneficiary computing system, used in some implementations to provide the disclosed technology.
Figure 3D:
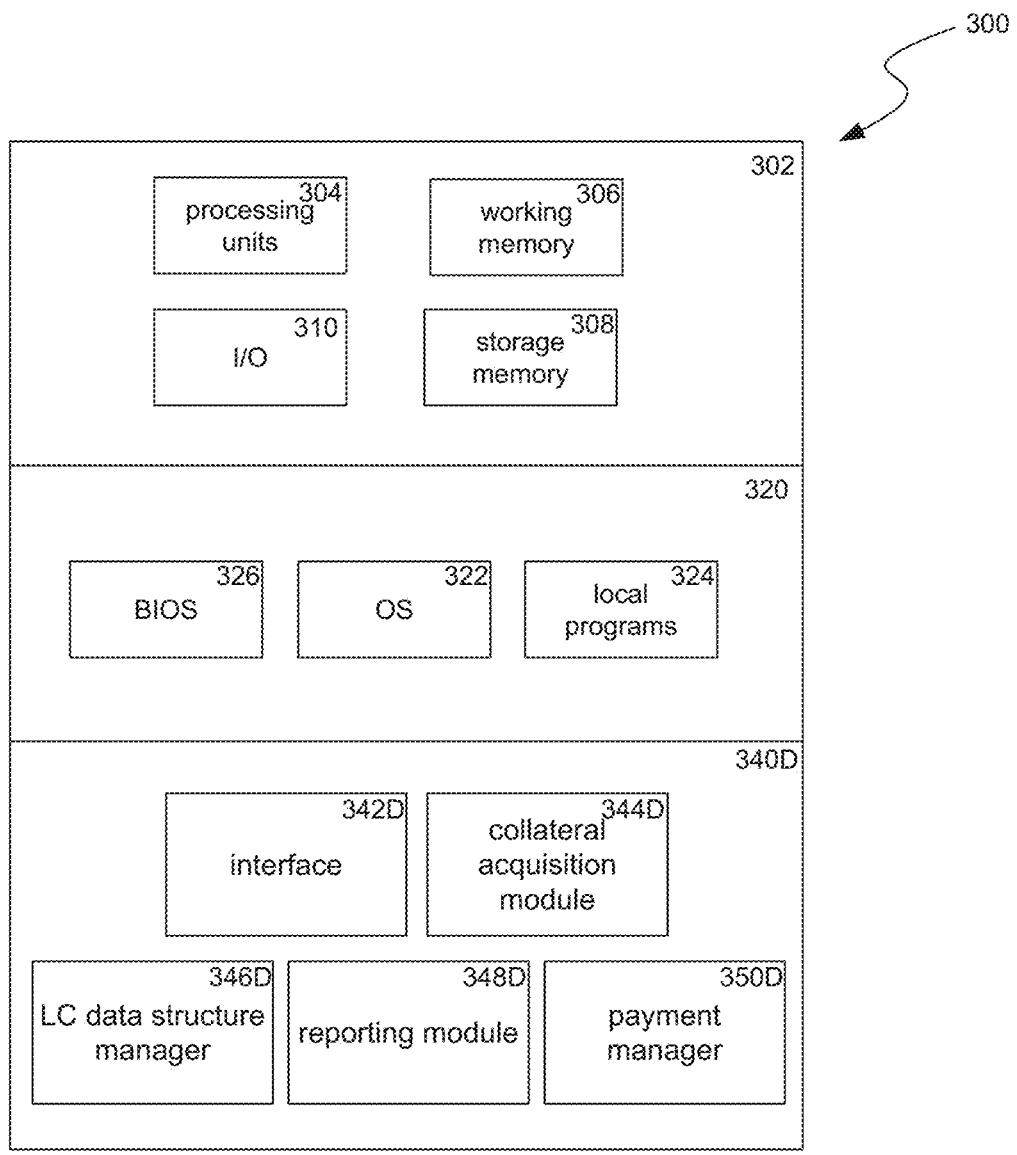
FIG. 3D is a block diagram illustrating a Custody Bank computing system holding a letter of credit, used in some implementations to provide the disclosed technology.

In some implementations, the set of components in each of FIGS. 3A-3D can be in a computing system that is distributed across multiple computing devices or can be an interface to a server-based application executing one or more of the specialized components. FIG. 3A is an example LC Issuer computing system, FIG. 3B is an example LC Applicant computing system, FIG. 3C is an example LC Beneficiary computing system, and FIG. 3D is an example LC Custody Bank computing system.

In FIG. 3A, specialized components 340A can be sub-components of a corresponding general software application 320, such as a corresponding local program 324. Specialized components 340A can include collateral acquisition module 344A, LC data structure manager 346A, reporting module 348A, agreement document generator 350A, and components that can be used for providing user interfaces, transferring data, and controlling the specialized components, such as interface 342A.

Collateral acquisition module 344A, can receive an indication of collateral or a specified dollar amount of collateral. This indication can be provided through interface 342A, e.g., based on specifics from an application for a letter for credit from an Applicant computing system. Collateral acquisition module 344A can make a purchase of the specified collateral or of a previously specified collateral type in the specified amount. The purchase can result in the Issuer computing system having a "hold" on the collateral, i.e. data proving a right to use and transfer the collateral, such a database entry indicating the collateral is deposited in an account of the Issuer, ownership certification or identification numbers for the purchased collateral, proof of purchase receipts, etc.

LC data structure manager 346A can create a first LC data structure that records features of a letter of credit, such as who the Applicant, Beneficiary, and Custody Bank (Nominated Person and Paying Agent) are; how much the Stated Amount is; features of the various agreement documents generated and executed by Agreement document generator 350A; a par amount; aspects of the collateral such as the amount, type, and data providing the hold, coupon dates, value at maturity; etc. LC data structure manager 346A can fill in values for these fields that are taken from the application for the letter of credit from the Applicant computing system, from results of the agreement document generator 350A, from results of the collateral acquisition module 344A, and from other interactions with market entities. LC data structure manager 346A can update fields in the LC data structure based on reporting from the Custody Bank, modification requests from the Applicant, market pricing data, or other reports from market entities or in response to input from an operator of the Issuer computing system, through a user interface of Interface 342A.

Reporting module 348A can provide various reporting and notifications to other market entities, using data from its first LC data structure. For example, the Issuer computing system can report creation and details of the letter of credit to one or more of the Applicant computing system, Beneficiary computing system, and Custody Bank computing system.

Agreement document generator 350A can, upon receiving the application for a letter of credit from the Applicant computing system through interface 342A, generate and execute various agreement documents. The agreement documents can include one or more of a reimbursement agreement, the letter of credit, a security agreement, a custody agreement, and a trust agreement or trust declaration. Using interface 342A, the Issuer computing system can communicate these agreements to the appropriate computing systems of the Applicant, Custody Bank, or Beneficiary. Upon receiving the proper execution of these documents in return, Agreement document generator 350A can simultaneously or substantially simultaneously close the agreement documents. Agreement documents can close substantially simultaneously whereby, upon closing a first of the agreement documents, the remaining agreement documents close within a threshold amount of time and legal mechanisms cause the remaining agreement documents to close automatically in a manner that parties to the agreement documents cannot prevent upon the closing of the first of the agreement document.

Interface 342A can also provide various user interfaces for controlling and retrieving data from the Issuer computing system. These interfaces can be browser based, a stand-alone application, a mobile app, etc. For example, the user interfaces provided for Issuer computing system can provide access to read or change information from the LC data structure managed by LC data structure manager 346A.

In FIG. 3B, specialized components 340B can be sub-components of a corresponding general software application 320, such as a corresponding local program 324. Specialized components 340B can include LC request module 344B, LC data structure manager 346B, reporting module 348B, and components which can be used for providing user interfaces, transferring data, and controlling the specialized components, such as interface 342B.

LC request module 344B can be used by an Applicant computing system to interface with an Issuer computing system to apply for a letter of credit. LC request module 344B can cause interfaces 342B to provide a user interface to an Applicant, which can gather information such as a requested amount, a Beneficiary, which Issuer to apply from, a collateral to use in the letter of credit, etc. LC request module 344B can then make a LC request to an Issuer computing system, providing the information necessary to establish the letter of credit. LC request module 344B can also provide modules for the Applicant to execute and return agreement documents, from the Issuer computing system, to establish the letter of credit.

LC data structure manager 346B can, upon establishment of the letter of credit, create and manage an LC data structure that records features of a letter of credit, such as who the Issuer, Beneficiary, and Custody Bank (Nominated Person and Paying Agent) are; how much the Stated Amount is; features of the various agreement documents; a par amount; aspects of the collateral such as the amount, type, and data providing the hold, coupon dates, value at maturity; etc. LC data structure manager 346B can fill in values for these fields that are taken from the application generated by LC request module 344B, from results of executed agreement documents, and from reporting from other market entities, such as the Issuer computing system, Custody Bank computing system, or Beneficiary computing system. LC data structure manager 346A can update fields in the LC data structure based on reporting from these market entities or in response to input from the Applicant, through a user interface of Interface 342B.

Reporting module 348B can provide various reporting and notifications to other market entities, using data from its first LC data structure. For example, the Applicant computing system can report application for the letter of credit or modification or termination requests for the letter of credit to one or more of the Issuer computing system, Beneficiary computing system, and Custody Bank computing system.

Interface 342B can also provide various user interfaces for controlling and retrieving data from the Applicant computing system. These interfaces can be browser based, a stand-alone application, a mobile app, etc. For example, the user interfaces provided for Applicant computing system can provide access to read or change information from the LC data structure managed by LC data structure manager 346B.

In FIG. 3C, specialized components 340C can be sub-components of a corresponding general software application 320, such as a corresponding local program 324. Specialized components 340C can include payment request module 344C, LC data structure manager 346C, reporting module 348C, and components which can be used for providing user interfaces, transferring data, and controlling the specialized components, such as interface 342C.

LC data structure manager 346C can, upon establishment of the LC, create and manage an LC data structure that records features of a LC, such as who the Issuer, Applicant, and Custody Bank (Nominated Person and Paying Agent) are; how much the Stated Amount is; features of the various agreement documents; a par amount; aspects of the collateral such as the amount, type, and data providing the hold, coupon dates, value at maturity; etc. LC data structure manager 346C can fill in values for these fields that are taken from results of requesting payment through payment request manager 344C, executed agreement documents for the letter of credit, and from reporting from other market entities, such as the Issuer computing system, Custody Bank computing system, or Applicant computing system. LC data structure manager 346C can update fields in the LC data structure based on reporting from these market entities or in response to input from the Beneficiary, through a user interface of Interface 342C.

Payment request module 344C can be used by a Beneficiary computing system to make a payment request on a letter of credit from a Custody Bank computing system or to declare default under the letter of credit, with the Custody Bank, under the letter of credit. Payment request module 344C can structure the payment request or default declaration to conform to conditions of agreement documents for the letter of credit, as recorded by the LC data structure manager 346C in a LC data structure.

Reporting module 348C can provide various reporting and notifications to other market entities, using data from the LC data structure managed by LC data structure manager 346C. For example, the Beneficiary computing system can report collateral values, default declarations, draws under the letter of credit, etc., to one or more of the Issuer computing system, Applicant computing system, and Custody Bank computing system.

Interface 342C can also provide various user interfaces for controlling and retrieving data from the Beneficiary computing system. These interfaces can be browser based, a stand-alone application, a mobile app, etc. For example, the user interfaces provided for Beneficiary computing system can provide access to read or change information from the LC data structure managed by LC data structure manager 346C.

In FIG. 3D, specialized components 340D can be sub-components of a corresponding general software application 320, such as a corresponding local program 324. Specialized components 340D can include collateral acquisition module 344D, LC data structure manager 346D, reporting module 348D, payment manager 350D, and components which can be used for providing user interfaces, transferring data, and controlling the specialized components, such as interface 342D.

Collateral acquisition module 344D can be used by a Custody Bank computing system to establish a hold on collateral for a letter of credit. Collateral acquisition module 344D can be an account system whereby records of collateral ownership are stored. For example, upon receiving a version of a first LC data structure from an Issuer computing system with a digital hold on the collateral, the Collateral acquisition module 344D can use the digital hold to establish the Custody Bank as having rights to possess and transfer portions of the collateral. This can include depositing the collateral in an account designated, at the Custody Bank, for the letter of credit (as reflected in database entries or other ledger mechanisms).

LC data structure manager 346D can create a second LC data structure that records features of a letter of credit, such as who the Applicant, Beneficiary, and Issuer are; how much the Stated Amount is; features of the various agreement documents for the letter of credit; a par amount; aspects of the collateral such as the amount, type, and data providing the hold, coupon dates, value at maturity; drawn and undrawn amounts, etc. LC data structure manager 346D can fill in values for these fields that are taken from a version of the first LC data structure received from the Issuer computing system, from results of the collateral acquisition module 344D, and from other interactions with market entities. LC data structure manager 346D can update fields in the LC data structure based on reporting from the other market entities, from results of making payments or responding to default declarations from the Beneficiary computing system, modification requests from the Applicant or Issuer computing systems, market pricing data, or other reports from market entities or in response to input from an operator of the Custody Bank computing system, through a user interface of Interface 342D.

Reporting module 348D can provide various reporting and notifications to other market entities, using data from the LC data structure managed by LC data structure manager 346D. For example, the Custody Bank computing system can report one or more of amounts or values of the collateral, drawn or undrawn amounts, amounts owed back, outstanding fees, requests for termination, notifications of beneficiary draws, two-way requests, etc., to one or more of the Issuer computing system, Applicant computing system, and Beneficiary computing system.

Payment manager 350D can receive payment requests or default declarations from the Beneficiary computing system. Payment manager 350D can verify that the payment request is proper, e.g., by comparing values of the payment request to values in the second LC data structure managed by LC data structure manager 346D. In response to verifying that the request is proper, the payment manager 350D can provide payment in kind of the collateral, e.g., by providing all or a portion of the collateral, using the hold on the collateral from the second LC data structure, to the Beneficiary computing system.

Interface 342D can also provide various user interfaces for controlling and retrieving data from the Custody Bank computing system. These interfaces can be browser based, a stand-alone application, a mobile app, etc. For example, the user interfaces provided for Custody Bank computing system can provide access to read or change information from the LC data structure managed by LC data structure manager 346D.

Those skilled in the art will appreciate that the components illustrated in FIGS. 1-3D described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
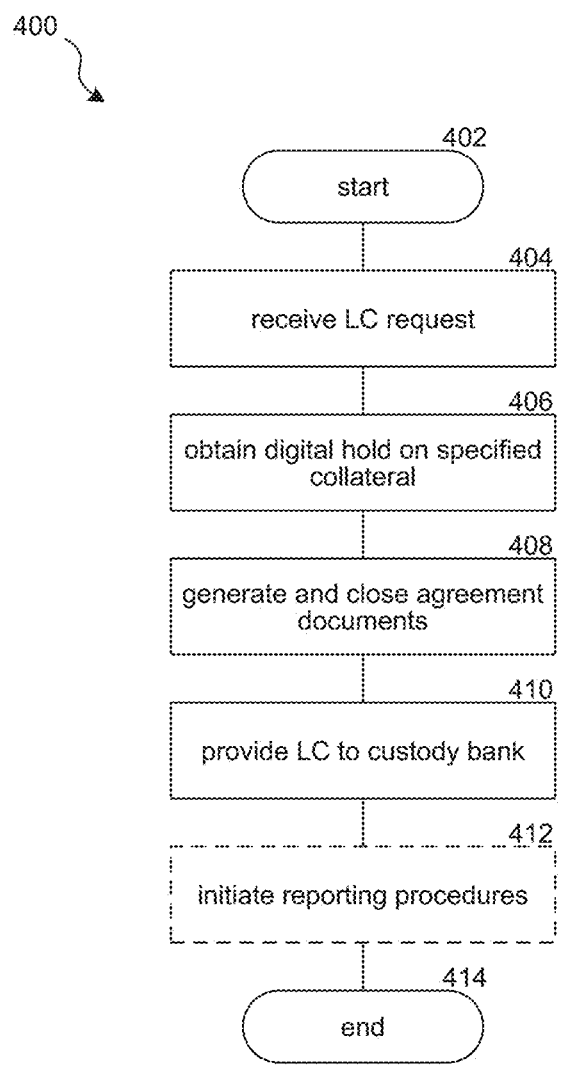
FIG. 4 is a flow diagram illustrating a process used in some implementations for a letter of credit Issuer computing system to establish a new letter of credit or amend the Stated Amount of existing letters of credit and transfer the associated collateral.

FIG. 4 is a flow diagram illustrating a process 400 used in some implementations for a LC Issuer computing system to establish a new letter of credit. Process 400 begins at block 402 and continues to block 404. At block 404, the Issuer computing system can receive, from an Applicant computing system, an LC request to establish a new LC. The request to establish the new LC can specify the Applicant, a Beneficiary, an amount of collateral requested, and other data elements the Issuer computing system can use to generate a first LC data structure representing the letter of credit. In some implementations, the Issuer only issues letters of credit on behalf of a single applicant for multiple Beneficiaries. In some implementations, the Issuer only issues letters of credit on behalf of a single applicant for a single Beneficiary.

At block 406, the Issuer computing system can obtain a digital hold on (e.g., by purchasing) a specified amount of collateral. In various implementations, the collateral type can be specified by the LC request or can be a type selected by the Issuer computing system in an amount matching an amount specified in the LC request. The digital hold can be any data supplying access or confirming ownership of the collateral, e.g., a purchase confirmation, identification numbers, ledger entries, etc.

At block 408, the Issuer computing system can generate agreement documents such as a security agreement, a custody agreement, a reimbursement agreement, a trust agreement, etc. In some implementations, these agreement documents can be generated by filling a template based on information in the LC request and variables established by the Issuer computing system such as who the Custody Bank will be and what type of collateral to use. The Issuer computing system can provide various of these agreement document to other entities such as the Applicant, Custody Bank, or Beneficiary. Upon the agreement documents being executed, the Issuer computing system can simultaneously close the agreement documents and establish the letter of credit by creating a corresponding first LC data structure. The first LC data structure can identify the Applicant, Beneficiary, Stated Amount, and provide access to the purchased collateral, which tracking additional information about the letter of credit such as the Stated Amount, par value, etc.

At block 410, the Issuer computing system can provide a version of the first LC data structure to a Custody Bank computing system. This can include designating the Custody Bank as the nominated person and as the paying agent for the letter of credit, eliminating the possibility of double payment. Furthermore, by including the hold on the collateral to the Custody Bank computing system to make payments on the letter of credit in kind from the collateral, risks of automatic stays are eliminated.

At block 412, the Issuer computing system can initiate reporting procedures for the letter of credit, which can use real time updated values from the first LC data structure. These reporting procedures can trigger ongoing reporting, as indicated by the dashed line format of block 412. These reporting procedures, for example, can include updating a Stated Amount field in the first LC data structure, drawn and undrawn amounts, letter of credit status, etc. Drawn letters of credit may be notified to the Issuer computing system by the Beneficiary computing system or the Custody Bank computing system, causing the Issuer computing system to update its first LC data structure. As the Issuer computer system tracks, in the first LC data structure, reimbursement obligations from the Applicant and movement of collateral between accounts, these factors can be reported to other market entities. In the event of being notified of a draw on the letter of credit, the Issuer computing system will perform calculations and update the Stated Amount in the first LC data structure. The Issuer computing system can also receive requests from the Applicant computing system regarding potential amendments to existing letters of credit, terminations, or the submission of new applications for new letters of credit. The Issuer computing system can respond by updating its first LC data structure and providing corresponding notifications to the Beneficiary computing system, Applicant computing system, and/or Custody Bank computing system as needed.

Figure 5:
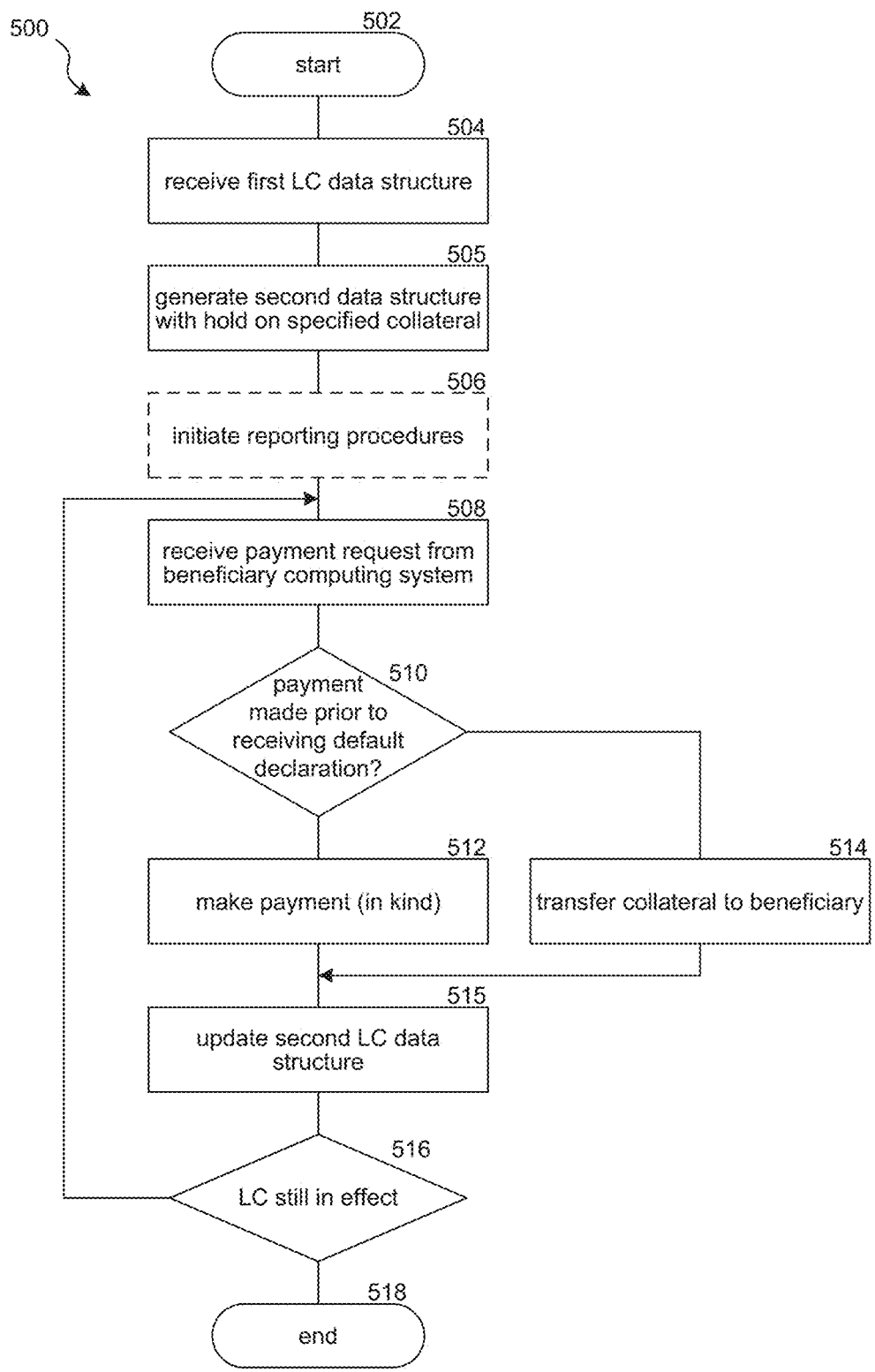
FIG. 5 is a flow diagram illustrating a process used in some implementations for a Custody Bank computing system to establish, amend, and manage a letter of credit and the associated collateral.

FIG. 5 is a flow diagram illustrating a process 500 used in some implementations for a Custody Bank computing system to establish custody over a LC. Process 500 begins at block 502 and continues to block 504. At block 504, the Custody Bank computing system can receive a version of the first LC data structure from the Issuer computing system, e.g., sent at block 410. The version of the first LC data structure can specify the Issuer, the Applicant, the Beneficiary, a Stated Amount, and can provide a hold on the collateral operable to permit the Custody Bank computing system to access the collateral obtained by the Issuer computing system at block 406. In various implementations, the version of the first LC data structure can include fields, such as payment procedures and requirements, coupon dates, par amount, etc. At block 504 the Custody Bank can be designated as the nominated person and paying agent for the letter of credit.

At block 505, the Custody Bank computing system can transform the received version of the first LC data structure into a second LC data structure with data from the first LC data structure. The second LC data structure can include a hold on the specified collateral. For example, the hold can include accepting the collateral to be transferred to the relevant account of the Custody Bank.

At block 506, the Custody Bank computing system can initiate updating and reporting procedures for the letter of credit, using data from its second LC data structure. As the Custody Bank computing system receives updates, in real time, regarding the letter of credit, it can modify its second LC data structure (e.g., the Stated Amount, par value, drawn and undrawn values, etc.). The Custody Bank computing system can also track consent of requests for amendments and account terminations, and update its second LC data structure accordingly. In response to any updates to its second LC data structure, Custody Bank computing system can provide corresponding reports and notifications, e.g., to any of the Applicant computing system, the Beneficiary computing system, or the Issuer computing system.

At block 508, the Custody Bank computing system can receive a payment request from the Beneficiary computing system. The Custody Bank computing system can verify the payment request is proper, e.g., by comparing information in its second LC data structure to information included in the payment request, such as A) an identification that the payment request sender is the Beneficiary (e.g., using digital signatures) and B) that the amount of the payment is less than a current Stated Amount in the second LC data structure. In some implementations, the condition to complete the payment is verification of a digital signature included with the payment request that can be validated immediately by the Custody Bank computing system. This permits the Custody Bank computing system to make the payment immediately in kind from the non-cash collateral held by the Custody Bank computing system (e.g. in a segregated account).

If no declaration of default is received prior to reaching block 512, the Custody Bank computing system can, at block 512 make a payment to the Beneficiary from the collateral using the hold on the collateral from its second LC data structure. In some implementations, the Custody Bank computing system can sell a portion of the collateral, using its proof of custody of the collateral provided by the hold in the second LC data structure, and provide the resulting sale funds to the Beneficiary, e.g., by transferring them into an account of the Beneficiary. In some implementations, this transfer can be to an account, owned by the Beneficiary, that is managed by the Custody Bank, thus the transfer can occur solely in the accounting system (e.g. database) of the Custody Bank, allowing the transfer to be immediate. The Beneficiary then has the option to further transfer the payment, e.g. to another account at a different institution. In some implementations, the Custody Bank computing system can directly transfer a portion of the collateral, using the hold in the second LC data structure, to the Beneficiary. For example, the hold in the second LC data structure can allow the Custody Bank computing system to transfer the portion of the collateral from a tri-party account into an account of the Beneficiary.

If the payment at block 512 does not happen correctly, e.g., within a specified time limit or with specified conditions, as defined in agreement documents associated with the letter of credit, the Beneficiary can declare default on the payment. If, at block 510, the Custody Bank computing system has determined that default has been declared and it is correct, the Custody Bank computing system can respond by transferring collateral to the Beneficiary, e.g., using the hold in the second LC data structure to transfer ownership of the collateral to the Beneficiary.

At block 515, the Custody Bank computing system can update fields of the second LC data structure to reflect the completed payment from block 512 or in response to default declaration from block 514. In some implementations, this updating can further trigger reporting from the Custody Bank computing system to one or more of the other market entities, such as reporting a new Stated Amount, changing the status of the letter of credit (e.g., terminating it), specifying an amount drawn, etc.

At block 516, if the letter of credit is still in effect, process 500 can wait for another payment request from the Beneficiary computing system, and when it is received, return to block 508. If the letter of credit is not still in effect, e.g., it was terminated after default or the Stated Amount has reached zero, process 500 can continue to block 518, where it ends.

An Applicant, using an Applicant computing system can purchase one or more letters of credit, specifying a corresponding beneficiary for each. The Applicant computing system can record a Stated Amount for the letter of credit and drawn and undrawn exposure of each letter of credit. The request for a letter of credit from the Applicant computing system to an Issuer computing system can specify the Applicant, a Beneficiary, an amount of collateral requested, and other data elements the Issuer computing system can use to generate a first LC data structure. The Issuer computing system can also generate agreement documents (as described in relation to FIG. 4), some of which it can provide to the Applicant computing system. With input from a user of the Applicant computing system, the Applicant computing system can execute and return the agreement documents.

The Applicant computing system can maintain its own LC data structure, which it can update upon receiving notifications (e.g., of drawn letters of credit, honored or dishonored payment requests, collateral status, and value updates) from a Beneficiary computing system, a Custody Bank computing system, an Issuer computing system, or another market price data store. The Applicant computing system can use its LC data structure to track reimbursement obligations owed by the Applicant and prepayments already made of fees and expenses by the Applicant to the Issuer. The Applicant computing system can also make requests to any of the other computing systems, e.g., regarding terminations, amendments, or other matters, and make corresponding updates to its LC data structure. In some implementations, these processes by the Applicant computing system can be initiated, managed, or monitored by a user through a user interface, e.g., an application, a browser-based interface, a mobile application, or other interface. For example, such an interface can allow a user to initiate the LC request, execute the agreement documents, and receive real time updates to the Stated Amount. The Applicant computing system can provide reports and notifications to the Beneficiary computing system, the Custody Bank computing system, the Issuer computing system, or other market entities.

The Beneficiary computing system can generate its own LC data structure upon consenting to a letter of credit that an Applicant is establishing with an Issuer. The Beneficiary computing system can update its LC data structure upon receiving consent requests from the Applicant computing system, when it makes a payment request to the Custody Bank computing system, when the Custody Bank computing system responds to payment requests, or as it receives mark-to-market Stated Amount updates. The Beneficiary computing system can use its LC data structure to track reimbursement obligations owed by the Applicant and in making reporting to market entities. In some implementations, these processes by the Beneficiary computing system can be initiated, managed, or monitored by a user through a user interface, e.g., an application, a browser-based interface, a mobile application, or other interface. For example, such an interface can allow a user to receive notifications of issued letters of credit, initiate a payment, declare default on a requested payment, and receive real time updates to the Stated Amount. The Beneficiary computing system can provide reports and notifications to the Applicant computing system, the Custody Bank computing system, the Issuer computing system, or other market entities, e.g., by providing notifications of a draw on the letter of credit Stated Amount.

Figure 6:
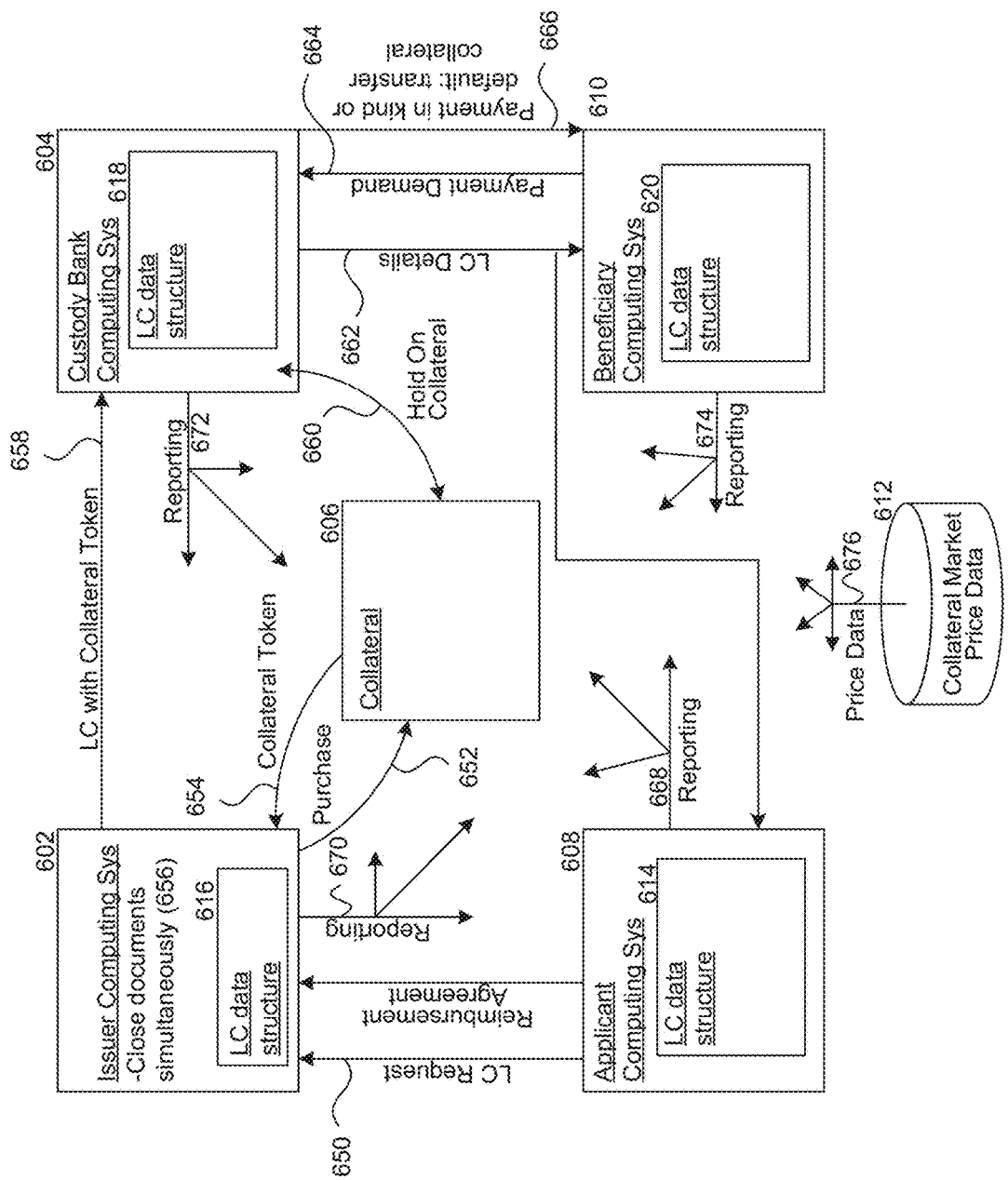
FIG. 6 is a conceptual diagram illustrating an example issuance, amendment, and management of an automatically collateralized letter of credit.

FIG. 6 is a conceptual diagram illustrating an example 600 of issuance and management of an automatically collateralized letter of credit. In example 600, a second LC data structure at the Custody Bank computing system tracks the value of the Issuer's obligation to pay the Stated Amount, as defined by a Collateral variable in the second LC data structure. Also in example 600, a value in the second LC data structure for the Collateral, held by the Custody Bank, can be updated continuously using pricing data.

Example 600 includes Applicant computing system 608 (storing a LC data structure 614); Issuer computing system 602 (storing a LC data structure 616); Custody Bank computing system 604 (storing a LC data structure 618); Beneficiary computing system 610 (storing a LC data structure 620); collateral 606, and collateral market price data provider 612.

Example 600 begins at 650 as the Applicant computing system sends an LC request to the Issuer computing system. The LC request can specify the Applicant, an amount for the LC (which will vary corresponding to the value of the collateral), a Beneficiary, and other data for the LC Issuer to generate LC data structure 616.

At step 652, Issuer computing system 602 can make a purchase of collateral in the amount requested and Issuer computing system 602 can receive, at block 654, a token (such as collateral identification numbers, confirmation that the collateral has been allocated to an account of the Issuer, ledger entries, etc.) representing the purchased collateral 606. Issuer computing system 602 can generate agreement documents, such as a reimbursement agreement, a security agreement, a custody agreement, or a trust agreement or trust declaration. At step 655, these documents can be provided to the various computing systems of the entities that will authorize the agreements. In example 600, step 655 shows the reimbursement agreement being sent, confirmed, and returned from the Applicant computing system 608. However, other agreements can be sent to others of the parties. At step 656, once all the agreements have been authorized by the appropriate parties, the agreement documents are closed simultaneously. Issuer computing system 602 can then generate (or update) LC data structure 616. LC data structure 616 can specify, fields such as the Issuer, Beneficiary, Applicant, Custody Bank, Stated Amount, Collateral data (type, amount, par value, coupon dates, maturity info), etc.

At step 658, the Issuer computing system 602 can transfer a version of LC data structure 616, including some or all of the fields of the LC data structure 616, to Custody Bank computing system 604. This transfer can also setup the Custody Bank as the nominated person and paying agent for the letter of credit. In response, Custody Bank computing system 604 can generate LC data structure 618 with fields taken from the received LC data structure. At step 660, Custody Bank computing system 604 can use data provided in the received LC data structure to establish a hold on collateral 606, granting exclusive access to the collateral by the Custody Bank (effectively depositing the Collateral 606 into a tri-party custody account at the Custody Bank).

At step 662, details of the now established letter of credit can be distributed to any of the computing systems 602, 604, 608, or 610, to populate fields of LC data structures 614-620. While in example 600, this distribution of data is shown as being from Custody Bank computing system 604 to Beneficiary computing system 610 and Applicant computing system 608, this step can be performed in various ways and at various points, such as by Issuer computing system 602 providing this data to the other computing systems as part of establishing the LC data structure 616 or closing the agreement documents.

At step 664, the Beneficiary computing system 610 can submit a demand for payment, under the letter of credit or upon default, to the Custody Bank computing system 604, per terms defined in LC data structures 620 and 618. In some implementations of the present technology, the demand for payment can be a draw request through an "MT 542 instruction," rather than a traditional "MT 707 instruction." In other implementations of the present technology, the demand for payment could be an encrypted digital message using a public/private key for authentication/verification by the Custody Bank. In some implementations, if a previous request for payment from the Beneficiary computing system 610 is not honored within an established time frame, payment demand 664 can be a declaration of default with instructions to the Custody Bank computing system 604 to release the Collateral 606 to the Beneficiary. Because all payment instructions 664 from Beneficiary computing system 610 are sent to the Custody Bank computing system 604, not two separate entities, the system does not allow for double payment, despite the various parties otherwise operating different technology and communication platforms.

At step 666 Custody Bank computing system 604 can respond to the request 664, by making payments from the collateral 606 or in kind of the collateral or, if the request 664 is a proper declaration of default, by transferring the collateral 606 to the Beneficiary, e.g., by providing the hold on the collateral from LC data structure 618 to Beneficiary computing system 610. Custody Bank computing system 604 accomplishes this by first comparing data in the payment demand 664 to data in LC data structure 618, e.g., to verify that the request came from the listed Beneficiary; that the letter of credit has a sufficient Stated Amount to cover the amount of the payment; and, if the payment demand is a declaration of default, whether the conditions for default have been met. If the letter of credit is honored within an established time frame, at step 666 payment to the Beneficiary is made. This payment can be made in kind of the collateral listed in the LC data structure 618. For example, a number of U.S. Treasury securities can be transferred. If the payment demand 664 is a declaration of default and the declaration is deemed proper, step 666 can provide the hold on the collateral 606 to the Beneficiary computing system. Because the Custody Bank computing system 604 will make payment from the Collateral 606 (paid in kind) that is held by the Custody Bank, the Stated Amount of the letter of credit will always match the value of the collateral.

At step 676, the collateral market price data store 612 (e.g., public exchanges, Bloomberg, broker-dealer pricing runs, etc.) can provide price data to any of Issuer computing system 602, Beneficiary computing system 610, Applicant computing system 608, or Custody Bank computing system 604. Any of Issuer computing system 602, Beneficiary computing system 610, Applicant computing system 608, or Custody Bank computing system 604 can use this information to update value fields of their corresponding LC data structure 614-620. For example, the Stated Amount of the LC data structure can be continuously updated with real time market pricing for the Collateral 606. In some implementations, pricing data can be provided to one of these computing systems, such as Custody Bank computing system 604, which can provide corresponding valuation updates to one or more of the other computing systems through reporting 672. In various implementations, price data updates 676 can be triggered, for example, as new data is received, on events (e.g. a request for payment), on a periodic basis, or upon an identified market change.

At each of steps 668-674, the Issuer computing system 602, Beneficiary computing system 610, Applicant computing system 608, or Custody Bank computing system 604 can providing reporting, notifications, or other messaging to other market entities. For example, at 672, Custody Bank computing system 604 can report one or more of amounts or values of the collateral, drawn or undrawn amounts, amounts owed back, outstanding fees, requests for termination, notifications of Beneficiary draws, two-way requests, etc. At 668, Applicant computing system can provide credit risk reports, amount of collateral draws, notices of a letter of credit being invalidated, etc. At 674, Beneficiary computing system can provide reporting of collateral values, default declarations, LC draws, etc.

Several implementations of the disclosed technology are described above in reference to the figures. As noted previously, the computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" or "embodiments" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method performed by an Issuer computing system, the method comprising:
   receiving a digital letter of credit (LC) request from an Applicant computing system;
   obtaining, by a first automated agent software module, a first digital hold on a specified non-cash collateral in an amount matching a value stated in the digital LC request;
   generating, by the first automated agent software module, a first LC data structure and including the first digital hold in the first LC data structure; and
   providing, by a first automated agent software module, a version of the first LC data structure to a Custody Bank computing system,
   wherein the first automated agent software module interfaces with business systems to provide automated control of the first LC data structure; and
   wherein providing the version of the first LC data structure to the Custody Bank computing system causes the Custody Bank computing system to—
      generate a second LC data structure that includes one or more fields from the version of the first LC data structure and provides a second digital hold on the non-cash collateral identified from the version of the first LC data structure; and
      act on one or more payment requests from a computing system of a Beneficiary identified in the second LC data structure by (a) causing a payment to the Beneficiary in a form matching the collateral using the second digital hold to provide the Beneficiary access to at least a portion of the collateral; and (b) updating fields of the second LC data structure to reflect the response to the payment request.

2. The method of claim 1, wherein the generating of the second LC data and acting on the one or more payment requests are performed by a second automated agent software module that interfaces with the business systems to provide automated control of the second LC data structure.

3. The method of claim 1, wherein documentary requirements of the Custody Bank to establish a letter of credit represented by the second LC data structure include only a digital signature that the Custody Bank computer system verifies.

4. The method of claim 1, wherein the Custody Bank does not make any payments in relation to the one or more payment requests from its own assets and wherein the one or more payment requests are limited to being paid exclusively using the existing collateral to which the second digital hold provides access.

5. The method of claim 1, wherein the second LC data structure comprises at least fields that record a Stated Amount of a type of collateral, an Applicant, a Beneficiary, and a drawn amount.

6. The method of claim 1, wherein a value of the non-cash collateral and a Stated Amount in the second LC data structure continuously match in real-time.

7. The method of claim 1 further comprising:
   generating multiple agreement documents in relation to the LC request by filling in portions of template agreement documents using information included in the first LC data structure, wherein the agreement documents comprise:
      a reimbursement agreement;
      a letter of credit;
      a security agreement; and
      a custody agreement;
   causing the agreement documents to close substantially simultaneously.

8. The method of claim 1, wherein providing the version of the first LC data structure to the Custody Bank computing system further causes the Custody Bank computing system to initiate reporting procedures including reporting one or more of:
   amounts or values of the specified collateral including any incomes received;
   drawn or undrawn amounts;
   outstanding fees;
   requests for termination;
   notifications of Beneficiary draws;
   two-way requests; or
   any combination thereof.

9. The method of claim 1, wherein the first digital hold and the second digital hold are data items that provide a right to use and transfer the specified collateral.

10. The method of claim 9, wherein each of the first digital hold and the second digital hold are one of:
   a database entry indicating the specified collateral is deposited in an account of the entity with the hold;
   an ownership certification for the specified collateral;
   identification numbers for the specified collateral;
   proof of purchase receipts of the specified collateral; or
   a ledger entry indicating the specified collateral.

11. The method of claim 9, wherein the second digital hold provides a perfected security interest for the Beneficiary in the collateral.

12. The method of claim 1, wherein providing the version of the first LC data structure to the Custody Bank further causes the Custody Bank to:
   be assigned as both a paying agent role and a nominated person role in relation to a letter of credit referenced by the second LC data structure; and
   hold the collateral in a segregated custody account.

13. The method of claim 1,
   wherein the Custody Bank computing system has a third LC data structure specifying the same Applicant as the second LC data structure;
   wherein the third LC data structure specifies a different Beneficiary than the second LC data structure;
   wherein payments made in relation to the third LC data structure and the second LC data structure are made from the same collateral; and
   wherein, upon receiving an LC amendment request from the Applicant, the Custody Bank computing system:
      confirms that total of a new first Stated Amount for the second LC data structure and a new second Stated Amount for the third LC data structure, each specified in the amendment request, does not exceed an amount of the collateral;
      confirms consent by the Beneficiary computer system to the amended Stated Amount; and
      updates the Stated Amount specified in the second LC data structure to be the new first Stated Amount and updates the Stated Amount specified in the third LC data structure to be the new second Stated Amount.

14. A computer-readable storage medium storing instructions that, when executed by a Custody Bank computing system, cause the Custody Bank computing system to perform operations comprising:
   receiving a version of a first LC data structure from an Issuer computing system in relation to a letter of credit (LC), wherein the first LC data structure was created by the Issuer computing system in response to an LC request from an Applicant computing system and wherein the first LC data structure includes a first digital hold on a specified collateral in an amount matching a value stated in the LC request;

generating, by an automated agent software module, a second LC data structure that includes one or more fields from the version of a first LC data structure and provides a second digital hold on collateral identified from the version of the first LC data structure; and acting, by the automated agent software module, on one or more payment requests from a computing system of a Beneficiary identified in the second LC data structure by (a) causing a payment to the Beneficiary in a form matching the collateral using the second digital hold to provide the Beneficiary access to at least a portion of the collateral; and (b) updating fields of the second LC data structure to reflect the response to the payment request;

wherein the automated agent software module interfaces with business systems to provide automated control of the second LC data structure.

15. The computer-readable storage medium of claim 14, wherein documentary requirements of the Custody Bank computing to establish a letter of credit represented by the second LC data structure includes only a digital signature that the Custody Bank computer system verifies.

16. The computer-readable storage medium of claim 14, wherein the first digital hold on the specified collateral and the second digital hold on the specified collateral are data items that provide a right to use and transfer the specified collateral and each is one of:

a database entry indicating the specified collateral is deposited in an account of the entity with the hold;
an ownership certification for the specified collateral;
identification numbers for the specified collateral;
proof of purchase receipts of the specified collateral; or
a ledger entry indicating the specified collateral.

17. The computer-readable storage medium of claim 14, wherein the Custody Bank computing is both a paying agent role and a nominated person role in relation to the letter of credit.

18. The computer-readable storage medium of claim 14, wherein the Custody Bank computing system has a third LC data structure specifying the same Applicant as the second LC data structure;

wherein the third LC data structure specifies a different Beneficiary than the second LC data structure;

wherein payments made in relation to the third LC data structure and the second LC data structure are made from the same collateral; and wherein the operations further comprise, upon receiving an LC amendment request from the Applicant:

confirming that total of a new first Stated Amount for the second LC data structure and a new second Stated Amount for the third LC data structure, each specified in the amendment request, does not exceed an amount of the collateral; and updating the Stated Amount specified in the second LC data structure to be the new first Stated Amount and updates the Stated Amount specified in the third LC data structure to be the new second Stated Amount.

19. An Issuer computing system comprising:

one or more processors; and a memory storing instructions that, when executed by the Issuer computing system, cause the Issuer computing system to perform operations comprising:

receiving a digital letter of credit (LC) request from an Applicant computing system;

obtaining a first digital hold on a specified collateral in an amount matching a value stated in the digital LC request;

generating a first LC data structure and including the first digital hold in the first LC data structure; and providing a version of the first LC data structure to a Custody Bank computing system, wherein providing the version of the first LC data structure to the Custody Bank computing system causes the Custody Bank computing system to— generate a second LC data structure that includes one or more fields from the version of the first LC data structure and provides a second digital hold on the collateral identified from the version of the first LC data structure; and act on one or more payment requests from a computing system of a Beneficiary identified in the second LC data structure by (a) causing a payment to the Beneficiary in a form matching the collateral using the second digital hold to provide the Beneficiary access to at least a portion of the collateral; and (b) updating fields of the second LC data structure to reflect the response to the payment request; and wherein one or more automated agent software modules interface with business systems to provide real-time updates ensuring an amount of the non-cash collateral and a Stated Amount in the second LC data structure continuously match in real-time.

* * * * *